United States Patent Office 2,949,341
Patented Aug. 16, 1960

2,949,341

CRYSTALLIZATION

Charles P. Green, Memphis, Tenn., assignor to E. I. du Pont de Nemours and Company, Wilmington, Del., a corporation of Delaware No Drawing. Filed Oct. 15, 1957, Ser. No. 690,196

2 Claims. (Cl. 23—79)

This invention relates to the production of sodium cyanide and is more particularly concerned with recovery of sodium cyanide from solution.

In the so-called wet method for preparing sodium cyanide, hydrogen cyanide vapor is reacted with sodium hydroxide in water to produce a solution of sodium cyanide, the solution is partially evaporated to form a slurry of sodium cyanide crystals and saturated mother liquor, the slurry is filtered to recover the crystals and the crystals are dried to give a solid sodium cyanide product.

In the large scale commercial operation this wet process is carried out continuously. Hydrogen cyanide, sodium hydroxide and water are continuously fed to the process in proper proportions to produce a concentrated sodium cyanide solution, water is continuously evaporated from the solution in a continuously operating crystallizer to form a slurry of sodium cyanide crystals in saturated mother liquor, the crystals are continuously separated from most of the mother liquor by filtration with a rotary vacuum filter to form a wet filter cake, and the filter cake is continuously dried to remove residual moisture, thereby producing the dry sodium cyanide product.

This continuous wet process has considerable economic advantage for large scale operations over the older Castner process for commercial production of sodium cyanide. However, Castner's process, in which dry ammonia, carbon and sodium are reacted at high temperature, has given a quality of product important for many uses of sodium cyanide and previously unattainable by an economical wet process. A high quality product is difficult to obtain by the wet process because of the high reactivity of cyanides in the presence of water. Hydrogen cyanide polymerizes to form a series of polymers of which the lower molecular weight compounds are soluble and colored. Sodium cyanide hydrolyzes in aqueous solution to form hydrogen cyanide, sodium formate and other objectionable decomposition products. Polymerization of hydrogen cyanide may therefore occur both during addition of hydrogen cyanide to the alkaline solution and subsequently as a result of hydrolysis of the salt formed.

In the wet process, as previously noted, when the slurry of sodium cyanide crystals in saturated mother liquor is filtered to recover the crystals, a filter cake is obtained of crystals wet with residual mother liquor, and the crystals must be dried to remove this residual liquid. Even with highly efficient filtering equipment a significant amount of mother liquor remains in the filter cake. The amount of such residual liquor directly determines the amount of drying required. It has now been found that a serious cause of contamination of the product is hydrolysis of sodium cyanide during drying of the filter cake. For example, the previous conditions produced an objectionable amount of sodium formate, and there was an unexpectedly sharp increase in the amount produced with increase in the amount of liquor left in the cake. Since the rate of hydrolysis and the rate of drying both vary directly with the temperature of drying, reducing the amount of moisture to be removed in the drying operation is the most desirable way of reducing the amount of hydrolysis.

It is an object of the present invention to provide a method for removing a greater amount of solution from the filter cake prior to drying in the recovery of sodium cyanide from solution. Other objects will become apparent from the specification and claims.

In ccordance with this invention it has been found that a surprising improvement in the filter-dewaterability of the wet sodium cyanide filter cake produced in the continuous commercial wet process discussed above is accomplished by controlling the iron content of the sodium cyanide solution so as to produce a filter cake containing a maximum of 22 parts per million of iron. The iron content of the solution must be extremely small, and is preferably controlled by supplying water to the process as water which has been distilled or otherwise treated to contain less than 1 part per million of iron, and by the use of wet-process equipment of stainless steel or other corrosion resistant materials.

Filter-dewaterability is used herein in reference to the maximum amount of mother liquor which can readily be removed from sodium cyanide crystals by continuous filtration alone with standard commercial equipment, such as a rotary vacuum filter. As used herein a filter-dewatered cake of sodium cyanide crystals is defined as the filter cake produced by removing substantially all of the mother liquor which can be readily be removed from the crystals by such continuous filtration without drying. In previous commercial operation the filter-dewatered cake has contained 17% to 20% or more of moisture, which corresponds to a much larger amount of saturated mother liquor.

Trace amounts of iron salts normally present in solution have been found to have a marked effect on the type of sodium cyanide crystals formed. The amounts involved are so small that accurate analysis of the solution is difficult, but the correspoonding concentration in the filter cake has been found to be about ten times greater and can be determined readily. Therefore, it will be convenient to base controls on analysis of the filter cake.

By controlling the iron content of the sodium cyanide solution to produce a filter cake containing a maximum of 22 and preferably not over 20 parts per million of iron, the filter-dewaterability of the filter cake is improved to such an extent that common commercial types of rotary vacuum filters readily produce a filter-dewatered cake containing less than 13% moisture. As the iron content rises above 20 p.p.m., with other conditions remaining the same, the dewaterability rapidly becomes poorer. At an iron content corresponding to 28 to 30 p.p.m. in the filter cake, the dewaterability decreases to such an extent that 17% to 20% moisture is retained by the filter cake. This increase of about 50% in the amount of liquor remaining in the filter cake will not only result in increased drying costs, but will also cause a proportional increase in the amount of mother liquor impurities found in the product after evaporation of the water. An even more serious and unexpected effect of increased moisture in the filter cake is the marked increase in the amount of hydrolysis of sodium cyanide during the drying operation. The above increase of about 50% in moisture content has been found to approximately double the amount of sodium formate formed by hydrolysis during drying under comparable conditions.

The present invention is concerned with amounts of iron in solution which are so small that the undesirable effect of even such small amounts has been completely overlooked in production of sodium cyanide. This iron is introduced into the sodium cyanide solution by the aqueous sodium hydroxide feed and other aqueous solutions added, such as scrubber liquor produced in washing sodium cyanide dust from air used in the drying operation, and to some extent by corrosion of ferrous equipment. The most effective way of controlling the iron content of the sodium cyanide solution, so as to produce a filter cake containing a maximum of 22 parts per million of iron, is by supplying water to the process principally as water which contains less than 1 part per million of iron. Since iron is one of the most abundant and widely distributed elements in the ground, conventional water supplies contain far too much iron for this purpose. The unusually low iron content required is provided by distilling the water, or by converting the iron compounds to insoluble iron oxides and filtering the water, or by equivalent treatment. A further reduction of iron content can be accomplished by using process equipment of stainless steel or other materials which do not introduce iron into the solutions, even though conventional ferrous equipment gives adequate service in other respects. Commercial sodium hydroxide normally contains a small amount of iron, but the amount is not objectionable when the other sources of iron are reduced as indicated.

The unexpected effect of the iron content on the amount of moisture retained in the filter cake is best shown by tests made under actual operating conditions.

*Example I*

In a plant producing sodium cyanide by reacting hydrogen cyanide with sodium hydroxide in an aqueous solution, iron was introduced into the sodium cyanide solution at a rate of 0.0424 to 0.0477 pound per ton of sodium cyanide produced. The wet filter cake of sodium cyanide crystals produced with a commercial rotary vacuum filter contained 16.8 to 20.2 percent moisture before drying, and 28 parts per million of iron. The wet filter cake averaged 0.87% NaOH and 0.25% NaCOOH (sodium formate). After drying, with sufficient carbon dioxide added to the inlet air of the drier to convert most of the NaOH to sodium carbonate, the product analyzed 0.10% NaOH, 0.91% NaCOOH, 0.02% $H_2O$ and 96.7% NaCN, the remainder being sodium carbonate and other impurities.

The iron addition into the sodium cyanide solution was then reduced to about 0.001 pound per ton of sodium cyanide produced, with other operating conditions remaining the same. The moisture in the wet filter cake then decreased to below 13%, averaging approximately 12.0% moisture. The wet filter cake contained 13 parts per million of iron, 0.40% NaOH and 0.15% NaCOOH. After drying as before the product analyzed 0.10% NaOH, 0.47% NaCOOH, 0.02% $H_2O$ and 97.2% NaCN.

*Example II*

The sodium cyanide plant was operated under the same conditions as in Example I except that the rate at which iron was introduced into the sodium cyanide solution was varied with the following results:

| | | | | |
|---|---|---|---|---|
| Iron introduced (pounds/ton of NaCN produced) | 0.0096 | 0.0104 | 0.0144 | 0.0459 |
| Total iron in solution (pounds/ton of NaCN) | 0.034 | 0.040 | 0.044 | 0.060 |
| Moisture in filter cake before drying, percent | 12.2 | 13.0 | 13.6 | 17.3 |
| Iron in filter cake (parts per million) | 17 | 21 | 22 | 30 |
| Iron in filtrate (parts per million) | 2 | 2 | 4 | 9 |

From the above and numerous other tests which have been conducted it has been determined that the moisture content of the wet filter cake is substantially independent of the iron content of the filter cake up to a value of about 20 parts per million of iron, and then rises sharply with further slight increases in iron content. Under commercial conditions, as shown above, the moisture content of the wet filter cake can readily be maintained below 13% by limiting the amount of iron in solution. It is evident from Example I that this results in a substantial reduction in the amount of NaOH and other impurities in the mother liquor which are carried over into the product. Example I also shows that the lower moisture content of the filter cake results in a surprising reduction in the amount of sodium formate produced in the drying operation.

The improvement in quality makes the product suitable for uses which have previously required the more expensive product of the Castner process. The lower moisture content of the filter cake also results in direct savings in the cost of producing sodium cyanide. The same production rate can be maintained with smaller drying equipment. The annual saving in steam for heating alone will be important in large scale operation. Furthermore, the expense of neutralizing excess NaOH with carbon dioxide is greatly reduced or eliminated.

The quantity of sodium cyanide produced by the wet process greatly exceeds that of other alkali metal cyanides, so the invention has been illustrated by this process wherein the greatest advantages are found. However, the production of other alkali metal cyanides by the wet process, such as potassium cyanide, will also benefit from corresponding use of the invention.

Since many different embodiments of the invention may be made without departing from the spirit and scope thereof, it is to be understood that the invention is not limited by the specific illustrations except to the extent defined in the following claims.

I claim:

1. In a continuous process for producing crystalline sodium cyanide wherein hydrogen cyanide, sodium hydroxide and water are continuously supplied to the process to produce sodium cyanide in solution, water is continuously evaporated from the sodium cyanide solution to produce a slurry of sodium cyanide crystals in mother liquor, the crystals are continuously separated from the slurry by filtration with a rotary vacuum filter to form a filter-dewatered cake of sodium cyanide crystals and retained mother liquor, the method for improving the dewaterability of the filter cake to markedly reduce the amount of retained mother liquor which comprises controlling the iron content of said sodium cyanide solution to produce a filter cake containing a maximum of 22 parts per million of iron.

2. In a continuous process for producing crystalline sodium cyanide wherein hydrogen cyanide, sodium hydroxide and water are continuously supplied to the process to produce sodium cyanide in solution, water is continuously evaporated from the sodium cyanide solution to produce a slurry of sodium cyanide crystals in mother liquor, the crystals are continuously separated from the slurry by filtration with a rotary vacuum filter to form a filter-dewatered cake of sodium cyanide crystals and retained mother liquor, the method for improving the dewaterability of the filter cake to markedly reduce the amount of retained mother liquor which comprises controlling the iron content of said sodium cyanide solution by supplying said water to the process principally as water which contains less than 1 part per million of iron to produce a filter cake containing a maximum of 22 parts per million of iron.

References Cited in the file of this patent

UNITED STATES PATENTS

| | | |
|---|---|---|
| 1,614,523 | Cooper | Jan. 18, 1927 |
| 2,229,695 | Elmore | Jan. 28, 1941 |
| 2,365,417 | Kusman | Dec. 19, 1944 |
| 2,726,139 | Oliver | Dec. 6, 1955 |
| 2,773,752 | Kremer | Dec. 11, 1956 |